United States Patent [19]

Shiozawa

[11] Patent Number: 5,100,014
[45] Date of Patent: Mar. 31, 1992

[54] OXYGEN GAS CARTRIDGE

[75] Inventor: Tatsumi Shiozawa, Matsudo, Japan

[73] Assignee: Nippon Tansan Gas Company Limited, Tokyo, Japan

[21] Appl. No.: 564,364

[22] Filed: Aug. 7, 1990

[30] Foreign Application Priority Data

Aug. 8, 1989 [JP] Japan .................................. 1-92534

[51] Int. Cl.5 .............................................. B65D 8/00
[52] U.S. Cl. ................................. 220/256; 220/257; 220/258; 220/612; 220/89.2
[58] Field of Search ............... 220/3, 618, 256, 61, 220/614, 257, 258, 89.2, 89.1

[56] References Cited

U.S. PATENT DOCUMENTS

| | | | |
|---|---|---|---|
| 1,584,523 | 5/1926 | Egbert | 220/89.2 |
| 1,598,382 | 8/1926 | McNutt | 220/89.2 |
| 2,661,121 | 12/1953 | Coffman et al. | 220/89.2 |
| 2,895,492 | 7/1959 | Bell | 220/89.2 |
| 3,443,718 | 5/1969 | Post | 220/256 |
| 4,566,604 | 1/1986 | Wolf et al. | 220/618 |
| 4,594,214 | 6/1986 | Popp et al. | 220/258 |
| 4,720,038 | 1/1988 | Shepard | 220/618 |
| 4,738,372 | 4/1988 | Jernberg | 220/89.2 |

Primary Examiner—Joseph Man-Fu Moy
Attorney, Agent, or Firm—Koda and Androlia

[57] ABSTRACT

An oxygen gas cartridge which hardly leaks or explodes, comprising an inner sealing plate attached to a main body thereof by calking and an outer sealing plate welded to the main body by laser beams at the outside of the inner sealing plate. As inner pressure of the cartridge increases abnormally, the inner sealing plate will curve into a space between both sealing plates to be broken first, and then the outer sealing plate will be broken next.

2 Claims, 1 Drawing Sheet

ОXYGEN GAS CARTRIDGE

BACKGROUND OF THE INVENTION

(1) Field of the Invention

The present invention relates to an oxygen gas cartridge, which can be used in medicine, to promote health, in a disaster, to light a torch and so on.

(2) Prior Art

As shown in FIG. 4, to prevent leakge of oxygen gas O out of a cartridge 11, an opening of a main body 14 of the cartridge 11 is sealed by a sealing plate 12 disposed between the main body 14 and a packing 16, made of rubber for example, by calking.

Such a cartridge as described above is likely to leak when the temperature rises or falls extremely or the packing becomes too old. Especially when it is under −30° C., the calked area 19 is easily warped to allow gas leakage by difference of contraction rates of the metalic main body 14, the sealing plate 12 and the packing 16.

Electric welding of the sealing plate to the main body of a cartridge would secure much more complete sealing. Electric welding operation is, however, very dangerous, as the cartridge would explode easily because of the inner oxygen gas.

SUMMARY OF THE INVENTION

An object of the present invention is to present an oxygen gas cartridge that can prevent gas leakage almost completely.

Another object of the present invention is to present an oxygen gas cartridge that will not burst out even if inner pressure thereof has increased abnormally.

These and other objects and features of this invention will be better understood by the following detailed description and the accompanying drawings.

DESCRIPTION OF PREFERRED EMBODIMENTS

Figure 1:
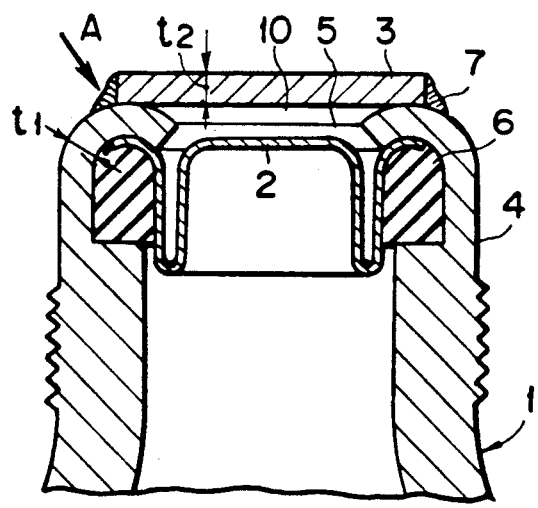
FIGS. 1, 2 and 3 are sectional views showing embodiments of oxygen gas cartridges according to the present invention.

In the drawings, the same numerals cover the same or similar parts.

In FIG. 1, an oxygen gas cartridge 1 comprises an inner sealing plate 2 and an outer sealing plate 3. The inner sealing plate 2 is disposed between a main body 4 and a packing 6 by calking. The inner sealing plate 2 seals the opening 5 primarily. The outer sealing plate 3 has a role to seal the opening 5 secondarily. The outer plate 3 is welded at the outside of the inner plate 2 to the main body 4 by laser beams. The laser beams are preferably projected in the tapered direction as shown by an arrow A. The outer plate 3 has preferably the same thickness $t_2$ as the thickness $t_1$ of a peripheral wall around the opening 5. In case that the outer sealing plate 3 is of a disc as shown in FIG. 1, the outer periphery of the plate 3 is preferably welded to the top of the main body 4 (fillet weld). Numeral 7 indicates a welding area.

The cartridge 1 is preferably provided with an inner plate receiving space 10 between the inner plate 2 and the outer plate 3. As gas pressure in the cartridge 1 becomes higher, the inner plate 2 will be curved outwards into the receiving space 10 to be broken. As the inner gas pressure increases further, the outer sealing plate 3 will be broken next. This prevents the main body 4 from explosion.

Arc or resistance welding is not usefull. During this type of welding operation, the rubber packing would also be heated to be broken, which would cause high pressure oxygen gas to burst out.

On the contrary, a laser beam, which is energy of high density and can be focussed on a microscopic area, is able to be projected only to an objective point. So that, the other parts than the objective point are not heated so much by a laser beam. Welding operation by a laser beam is quite safe, as the rubber packing is not broken.

Around the periphery of the outer plate 3, 120 to 150-watt of laser beams were projected in the direction of the arrow A as shown in FIG. 1 for five seconds, and the cartridge was hardly heated.

Figure 2:
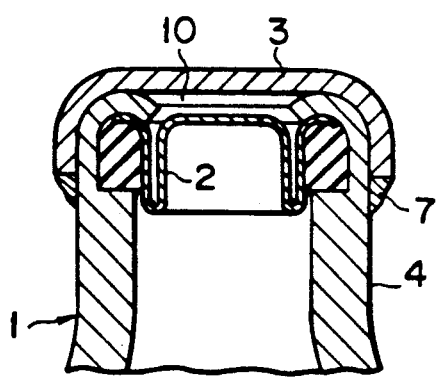

In FIG. 2, the main body 4 is crowned with a caplike outer sealing plate 3, and an opening end of the outer plate 3 is welded by laser beams to a side wall of the main body 4 (fillet weld).

Figure 3:
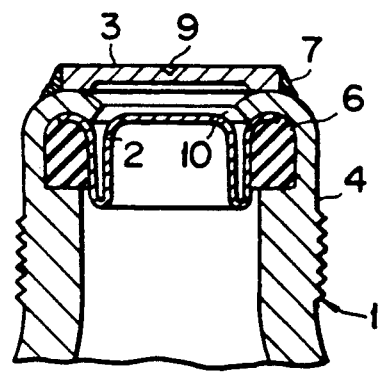
Figure 4:
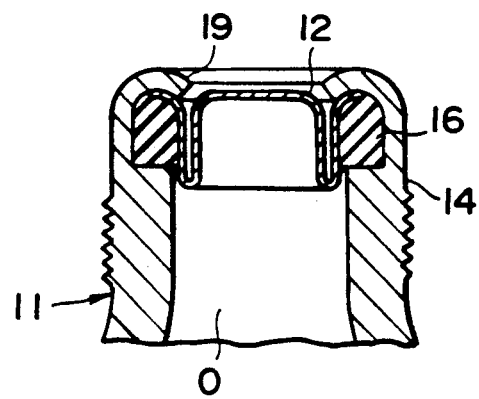
FIG. 4 is a sectional view showing an oxygen gas cartridge according to a prior art.

FIG. 3 shows another embodiment of a cartridge according to the present invention, wherein a safe sealing plate 3 is employed for the outer sealing plate. As the inner pressure becomes higher, the outer plate 3 will be cracked from a center hollow 9 to leak inner gas gradually, so the cartridge 1 will never move around.

According to the present invention, the inner sealing plate as well as the outer sealing plate prevents gas leakage, and the outer plate is welded by laser beams, so that gas leakage will be prevented almost completely.

As for the cartridge provided with the inner plate receiving space, if the inner pressure increases abnormally, the inner sealing plate will be broken first, and the outer sealing plate will be broken next, so that the main body will not be exploded.

I claim:

1. An oxygen gas cartridge comprising:
   an inner sealing plate, to be broken first in case the inner pressure increases abnormally, which seals an opening of a main body thereof primarily which has been charged with oxygen gas, disposed between said main body and a packing by calking,
   an outer sealing plate, to be broken next to said inner sealing plate, which seals said opening secondarily and which has the same thickness as of a peripheral wall around the opening, welded at the outside of said inner plate to said main body by laser beams, and
   an inner plate receiving space, between said inner sealing plate and said outer sealing plate, into which said inner sealing plate is able to be curved to be broken.

2. An oxygen gas cartridge as defined in claim 1, wherein said outer sealing plate is provided with a hollow in the center thereof.

* * * * *